May 26, 1959 R. JOLY ET AL 2,888,473
BROMINATED DERIVATIVES OF COMPOUNDS OF THE
PREGNANE SERIES AND METHODS OF MAKING SAME
Filed April 10, 1956 2 Sheets-Sheet 1
REACTION SCHEME A
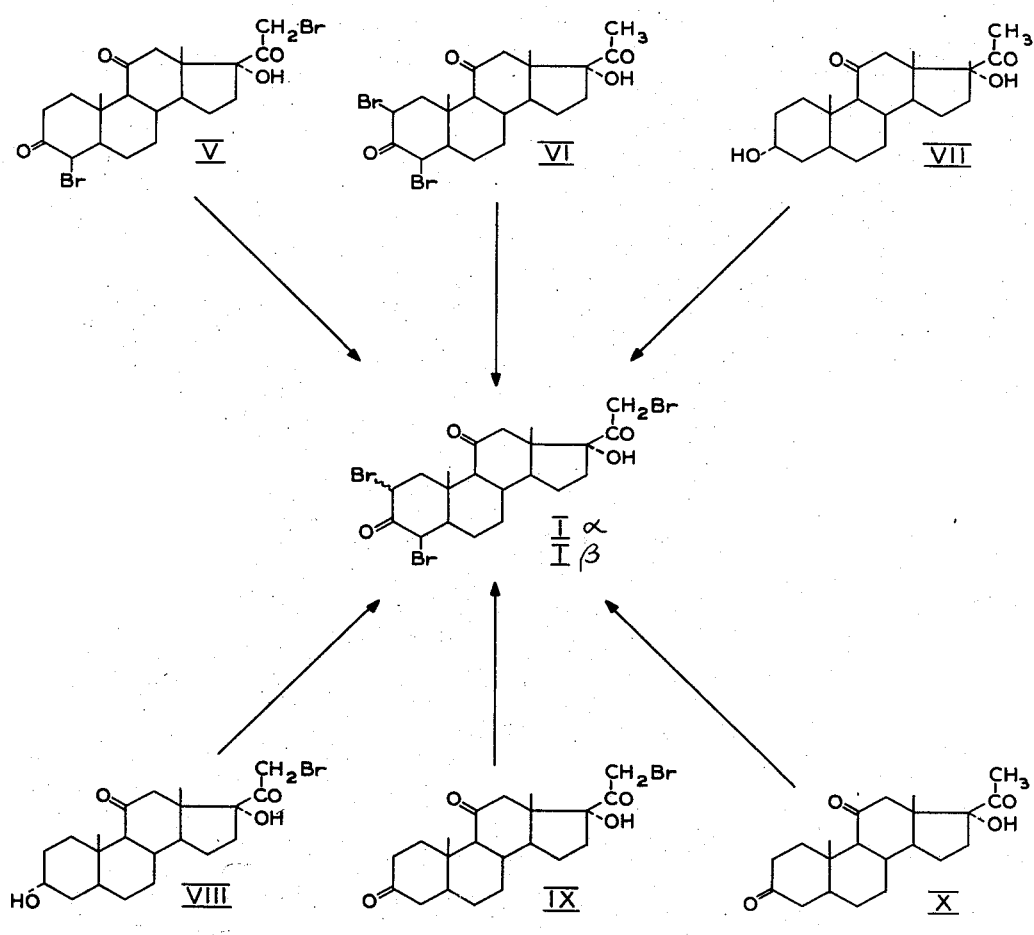
INVENTORS
ROBERT JOLY
GERARD NOMINE
BY DANIEL BERTIN
ATTORNEYS

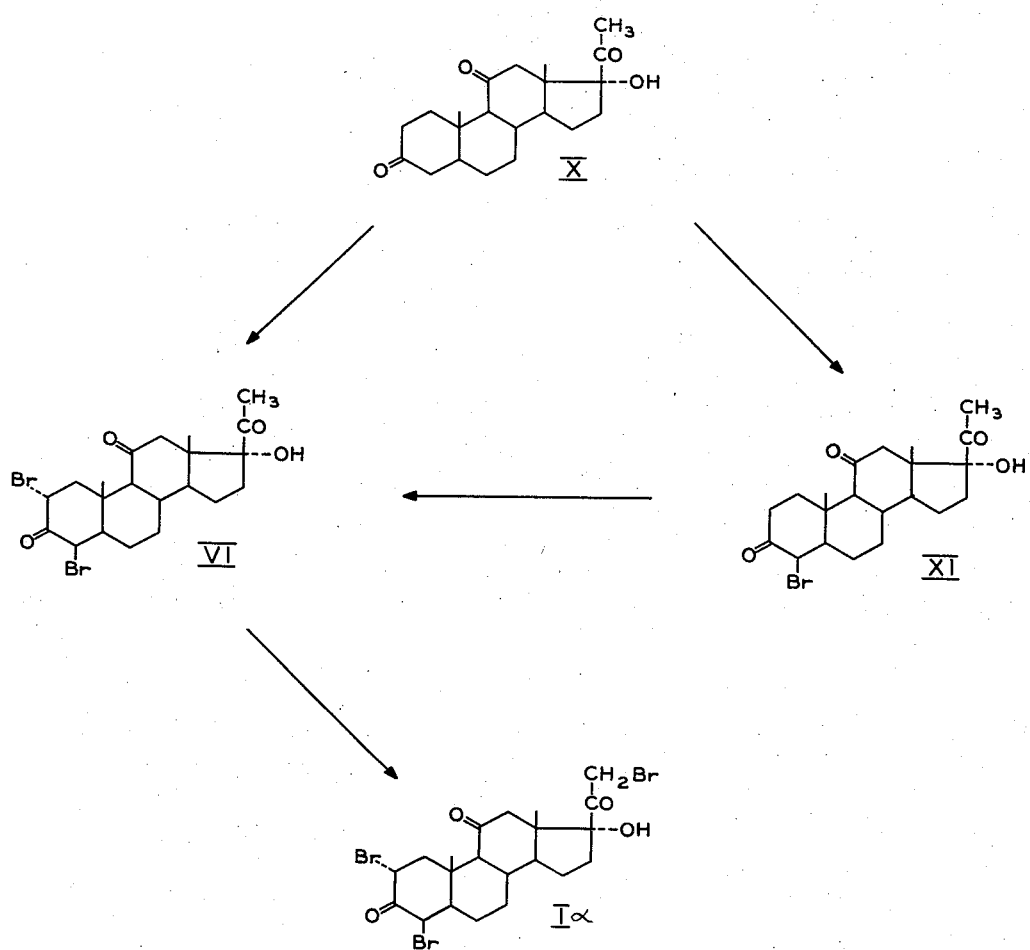

United States Patent Office
2,888,473
Patented May 26, 1959

2,888,473

BROMINATED DERIVATIVES OF COMPOUNDS OF THE PREGNANE SERIES AND METHODS OF MAKING SAME

Robert Joly, Montmorency, Gérard Nominé, Noisy le Sec, and Daniel Bertin, Montrouge, France, assignors to Les Laboratoires Français de Chimiotherapie, Paris, France, a French body corporate Application April 10, 1956, Serial No. 577,321

Claims priority, application France April 15, 1955

6 Claims. (Cl. 260—397.45)

The present invention relates to new, brominated derivatives of compounds of the pregnane series and to methods of making these derivatives.

Two new corticosteroids, namely $\Delta^{1,4}$-pregnadiene 17α, 21-diol 3,11,20-trione (also designated as metacortandracine or $\Delta^1$-dehydrocortisone) and $\Delta^{1,4}$-pregnadiene 11β, 17α,21-triol 3,20-dione (also designated as metacortandralone or $\Delta^1$-dehydrocortisol) have attained importance as therapeutic agents because of their pronounced antiarthritic effects.

One derivative of this invention, 17α-hydroxy 2,4,21-tribromo pregnane 3,11,20-trione (compound I) is of particular interest. We made the unexpected discovery that, upon debromohydrating compound I by the usual methods, the bromine in the 21-position is not attacked and compound I can be readily converted into 17α-hydroxy 21-bromo $\Delta^{1,4}$-pregnadiene 3,11,20-trione (compound II).

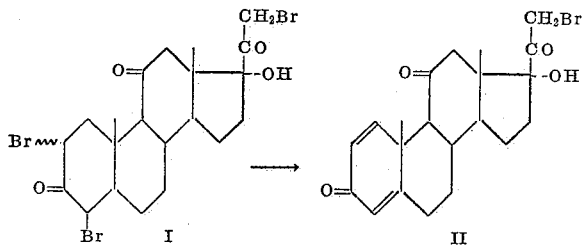

Saponification converts this new 21-bromo diene-1,4 (II) into $\Delta^1$-dehydrocortisone or metacortandracine (III), and the corresponding acetate (IV) is readily obtainable by acetoxylation.

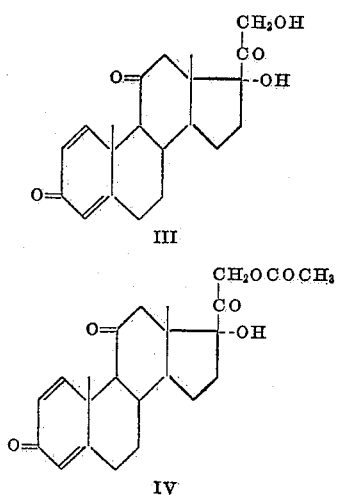

It is the principal object of the present invention to provide in 17α-hydroxy 21-bromo $\Delta^{1,4}$-pregnadiene 3,11, 20-trione, 17α-hydroxy 2α,4β-dibromo pregnane 3,11,20-trione and 17α-hydroxy 2,4,21-tribromo pregnane 3,11,20-trione new intermediates for making $\Delta^1$-dehydrocortisone.

It is another object of the invention to provide new, relatively simple and economic methods of preparing these intermediates.

These and other objects and advantages of the invention will become more obvious from the herein-following detailed description.

17α-hydroxy 2,4,21-tribromo pregnane 3,11,20-trione (I) exists in two stereoisomeric modifications. Depending upon the spatial location of the bromine in the 2-position, these two modifications differ clearly in their rotatory capacity.

One of them, the 17α-hydroxy 2α,4β,21-tribromo pregnane 3,11,20-trione is levorotatory, while the other, the 17α-hydroxy 2β,4β,21-tribromo pregnane 3,11,20-trione is dextrorotatory.

The preparation of one of the two modifications depends substantially upon the method of bromination used at the moment of fixing the bromine on carbon 2. We found that the levorotatory form (Iα) is obtained when starting from 4β,21-dibromo 17α-hydroxy pregnane 3,11, 20-trione (V), the preparation of which has been described and claimed in copending U.S. patent application Serial No. 384,562 of October 7, 1953, now Patent No. 2,768,191 of October 23, 1956 assigned to the assignee of the present application. The preparation according to the foregoing application is based on a treatment with bromine in dioxane. The dextrorotatory form (Iβ), on the other hand, is obtained by bromination of 17α-hydroxy 2β,4β-dibromo pregnane 3,11,20-trione (VI) in the 21-position. This last named compound has been described in Example 4 of the copending U.S. patent application Serial No. 360,878 of June 11, 1953, now Patent No. 2,768,189 of October 23, 1956, which also has been assigned to the assignee of this application. According to the said application, the compound is obtained upon dibromination with simultaneous oxidation of 3α, 17α-dihydroxy pregnane 11,20-dione (VII) by means of N-bromosuccinimide in acetic acid in the presence of an oxidizable alcohol and a small amount of water. However, the same dextro-rotatory compound (I) can be also obtained directly from compound VII by tribromination and simultaneous oxidation under the aforesaid conditions.

In addition, we found that the levorotatory isomer (Iα) is obtainable from 17α-hydroxy pregnane 3,11,20-trione (X), or from the 4β-monobrominated derivative XI thereof. Preparing, as indicated in the attached reaction scheme B, the new 2α,4β-diobromo 17α-hydroxy pregnane 3,11,20-trione (VI), it suffices to brominate the latter in the 21-position to obtain the desired levorotatory isomer Iα. According to the herein claimed invention, compound VI is prepared by dibrominating 17α-hydroxy pregnane 3,11,20-trione (X) in the 2,4-position in dioxane as the reaction medium, or by monobrominating, in the same medium, 4β-bromo 17α-hydroxy pregnane 3,11,20-trione (XI), after the latter has been obtained, as set forth in U.S. patent application Serial No. 360,878, by means of monobromination of compound X with the aid of N-bromosuccinimic acid in the presence of an oxidizable alcohol and a small amount of water.

Double debromohydration in the 2- and 4-position, applied to either one of the stereoisomeric forms of I, leads directly to the desired diene (II) The operation can be carried out with either lithium chloride in dimethylformamide as the reaction medium (J. Am. Chem. Soc. 1953, 75, 4432), or by preparing a dinitrophenyl hydrazone intermediate according to Demaecker and Martin (Nature 1954, 173, 266).

The saponification of the 21-brominated diene (II) results in the direct formation of metacortandracine or Δ¹-dehydrocortisone (III). If instead of saponifying the bromine, sodium-, potassium, lithium- or silver salts of organic acids are reacted with the brominated diene, esters of Δ¹-dehydrocortisone are obtained. According to one variation, in order to obtain, for example, metacortandracin acetate (IV), compound II is first reacted with sodium iodide in order to replace bromine by iodine. Upon treating with potassium acetate, Δ¹-dehydrocortisone acetate (IV) and potassium iodide are obtained.

The attached reaction schemes A and B illustrate the structural formulas of the different compounds. The melting points given in the following examples are instantaneous melting points, determined by means of the heated block methods (maquenne block). The spatial positions of bromines 2 and 4 have been ascertained by infrared spectrography as well as by chemical methods.

EXAMPLE 1

*Preparation of dextrorotatory 17α-hydroxy 2β,4β,21-tribromo pregnane 3,11,20-trione (I)*

50 g. of 2β, 4β-dibromo 17α-hydroxy pregnane 3,11,20-trione (VI), a compound described in Example 4 of copending application Serial No. 360,878 of June 11, 1953, having a specific rotation of $[\alpha]_D^{20}=+63°\pm1$ (c.=0.5%, acetone), and containing 31.4% bromine, are dissolved by heating to 40° C. in one liter of chloroform. Into this solution are introduced 5 cc. of a chloroform solution containing 10% dry hydrobromic acid and bromine, in the amount of 79 cc. of a 21% bromine solution, which corresponds to an excess of about 5%. Upon completion of the bromination, a nitrogen current is passed through the solution for several minutes. Thereupon, 250 g. of an ice-water mixture and 50 cc. of a sodium bisulfite solution of 36° Bé. are added. After stirring and permitting to settle, the chloroform layer is decanted, and the aqueous layer is extracted a second time with chloroform. The combined chloroform extracts are washed with water until neutral, and are then desiccated over sodium sulfate and concentrated under vacuum. Compound I crystallizes during the concentration. After cooling to about —10° C., compound I is dried and purified by means of washing twice with 50 cc. of chilled chloroform. After drying in the open air at room temperature, a 54% yield of compound I is obtained, having a melting point of 211° C. (decomposition); $[\alpha]_D^{20}=+82.5°\pm2$ (c.=1%, acetone). This product is sufficiently pure to be debromohydrated. For the analysis, it is purified by successive recrystallizations in dimethylformamide, acetone and, finally, in aqueous acetic acid. After drying, washing in water until neutral and again drying, the melting point of the new compound is 231° C. (decomposition); $[\alpha]_D^{20}=+83.5°\pm1.5°$ (c.=1%, acetone).

The compound is soluble in alcohol, acetone and in dimethylformamide, difficulty soluble in ether and chloroform, insoluble in water and benzene.

Analysis.—$C_{21}H_{27}O_4Br_3$=583.19.—Calculated: 43.24% C; 4.66% H; 41.11% Br. Found: 43.2% C; 4.7% H; 40.9% Br.

EXAMPLE 2

*Preparation of levoratory 17α-hydroxy 2α,4β,21-tribromo pregnane 3,11,20-trione (I)*

10 g. of 4β,21-dibromo 17α-hydroxy pregnane 3,11,20-trione (V), a compound described in Example 1 of copending application Serial No. 384,562 of October 7, 1953, having a specific rotation of $[\alpha]_D^{20}=+105°\pm2°$ (c.=1%, acetone) and containing 31% bromine, are dissolved in 100 cc. of dioxane of 35° C. Into this solution is introduced 1 cc. of a solution of gaseous hydrobromic acid in glacial acetic acid containing 38.8 g. of hydrobromic acid per 100 cc., followed by a rapid addition of 36.6 cc. of a 10% bromine solution in acetic acid (or an excess of 15%). The absorption of bromine is instantaneous. The reaction mixture is then poured into 1000 cc. of water containing 5 g. of crystalline sodium acetate. The white precipitate which is formed is desiccated and washed with water until the wash water is neutral. The partially dried product is taken up with 40 cc. of acetic acid at room temperature. After adding two and one-half volumes of water, the product is dried, washed with water until neutral and then vacuum dehydrated at room temperature. 11 g. of the tribrominated derivative (representing a yield of 95%) are obtained, containing 38.8% of bromine. It is further purified by two more washings with acetic acid and, after drying under vacuum, has a melting point of 230–232° C.; $[\alpha]_D^{20}=-4°\pm2°$ (c.=0.5%, acetone). This new compound is soluble in acetone, ethyl acetate, difficultly soluble in acetic acid, isopropanol, insoluble in benzene and water.

Analysis.—$C_{21}H_{27}O_4Br_3$=583.19.—Calculated: 43.24% C; 4.66% H; 41.11% Br. Found: 43.4% C; 4.7% H; 41.0% Br.

EXAMPLE 3

*Preparation of 21-bromo 17α-hydroxy Δ¹,⁴-pregnadiene 3,11,20-trione from dextrorotatory compound I*

20 g. of dextrorotatory compound I, obtained according to Example 1, are treated according to the method of Holysz (J. Am. Chem. Soc., 1953, 75, 4432) with 9.72 g. of lithium chloride dissolved in 200 cc. of dimethylformamide. After boiling for about 5 minutes, cooling rapidly, pouring into diluted acetic acid, drying, washing with water until neutral and drying under vacuum at ordinary temperature, the yield is approximately 70% of the theoretical. Melting point is 198° C. (decomposition); $[\alpha]_D^{20}=+171°\pm2°$ (c.=1%, dimethylformamide).

The product is sufficiently pure to be converted into Δ¹-dehydrocortisone.

For purification, the product is dissolved, at 70–80° C., in 56 volumes of 50% aqueous dimethylformamide. After cooling to 0° C. for one hour, drying and washing twice with one volume of 50% dimethylformamide, the product is desiccated, washed with water and dried by washing with acetone and ether. This 21-brominated diene, purified in the foregoing manner, melts at 250–252° C. (decomposition); $[\alpha]_D^{20}=+177°\pm2°$ (c.=1%, dimethylformamide); λ max. 239 mμ; ε=15,000 (ethanol). The new compound is soluble in alcohol and dimethylformamide, difficultly soluble in benzene and chloroform, insoluble in acetone and water.

Analysis:—$C_{21}H_{25}O_4Br$=421.33.—Calculated: 59.85% C; 5.98% H; 15.19% O; 18.97% Br. Found: 60.1% C; 6.0% H; 15.4% O; 18.9% Br.

EXAMPLE 4

*Preparation of 21-bromo 17α-hydroxy Δ¹,⁴-pregnadiene 3,11,20-trione from levorotatory compound I*

2.65 g. of the levorotatory compound I, obtained according to Example 2, are treated with lithium chloride in the presence of dimethylformamide. The resulting 1.4 g. of crude diene are purified by washing with acetone and recrystallizing in aqueous dimethylformamide. After desiccating and drying, 21-bromo 17α-hydroxy Δ¹,⁴-pregnadiene 3,11,20-trione is obtained, which is identical with the compound obtained according to Example 3.

EXAMPLE 5

*Preparation of Δ¹-dehydrocortisone acetate*

3 g. of 21-bromo 17α-hydroxy Δ¹,⁴-pregnadiene 3,11,20-trione, obtained according to Examples 3 or 4, are mixed with 1.3 g. of dry sodium iodide, whereupon 45 cc. of acetone and 21 cc. of absolute alcohol are added at room temperature. The diene dissolves very rapidly and sodium bromide is precipitated. After standing for 15 minutes, sodium bromide is separated and washed with a small amount of anhydrous acetone which is then reunited with the filtrate. After adding 3.55 g. of dry potassium acetate and 0.3 cc. of water, the solution is refluxed for one hour and a quarter while passing a current of nitrogen therethrough. After cooling, the mixture is poured into ice-water, dried and washed with water until the water no longer contains any potassium iodide. After desiccating and drying, crude $\Delta^1$-dehydrocortisone acetate is obtained at a yield of 80%. The product is purified by crystallization in acetone and decolorization by means of vegetable charcoal; the resulting pure $\Delta^1$-dehydrocortisone acetate sinters at 224° C. and melts at 236° C.; $[\alpha]_D^{20} = +185°$ (c.=1%, dioxane).

EXAMPLE 6

*Preparation of 2α,4β-dibromo 17α-hydroxy pregnane 3,11,20-trione (VI) from 17α-hydroxy pregnane 3,11,20-trione (X)*

After dissolving 10 g. of 17α-hydroxy pregnane 3,11,20-trione (X) in 150 cc. of dioxane, and cooling to a temperature of less than 10° C., 0.5 cc. of an acetic solution of hydrobromic acid, comprising 38.8 g. of anhydrous hydrobromic acid per 100 cc. of solution, are introduced. An acetic solution of bromine and sodium acetate is then slowly added while cooling so as to maintain the above-mentioned temperature. This solution consisting of:

| | | |
|---|---|---|
| Acetic acid | cc | 57.3 |
| Bromine | g | 10.6 |
| Anhydrous sodium acetate | g | 5.2 |

By means of this procedure, the presence of excessive bromide is avoided before the reaction is completed. Upon completion of the bromination, 1 g. of sodium acetate is added, and the solution is poured into one liter of ice water. The product is dried and washed with water until the water is neutral and free of bromide. After drying under vacuum at room temperature, 14.6 g. of a crude product are obtained that contains 31% bromine (theoretically 31.7%). After purifying the weakly dextrorotatory compound, first by means of two recrystallizations in about 50% acetic acid which produce a specific rotation of $[\alpha]_D^{20} = -30°$ (c.=1%, acetone), and then by means of dissolving in 26 volumes of anhydrous benzene while heating very slightly, adding an equal volume of cyclohexane, permitting to crystallize, desiccating and drying under vacuum at room temperature, the new product is obtained in analytically pure form, having a melting point of about 210° C. (decomposition); $[\alpha]_D^{20} = -30° \pm 2°$ (c.=1%, acetone).

*Analysis.*—$C_{21}H_{28}O_4Br_2 = 504.27$.—Calculated: 50.01% C; 5.59% H; 31.69% Br. Found: 50.2% C; 5.7% H; 31.6% Br.

EXAMPLE 7

*Preparation of 2α,4β-dibromo 17α-hydroxy pregnane 3,11,20-trione (VI) from 4β-bromo 17α-hydroxy pregnane 3,11,20-trione (XI)*

After mixing 2.47 g. of compound XI, obtained according to the general process described in patent application Serial No. 360,878 of June 11, 1953, and identical with the product described by Gallagher (J. Am. Chem. Soc., 1952, 74, 483), with 30 cc. of dioxane, 0.1 cc. of the acetic solution of hydrobromic acid described in Example 6 is introduced and bromination is carried out by adding a solution consisting of:

| | | |
|---|---|---|
| Acetic acid | cc | 5.8 |
| Bromine | g | 1.06 |
| Anhydrous sodium acetate | g | 0.48 |

Operating as in the foregoing examples, precipitating in water, washing and drying, 2.7 g. of a crude product are obtained that is slightly dextrorotatory. After purifying as in Example 6, the final product is 2α,4β-dibromo 17α-hydroxy pregnane 3,11,20-trione, the same product as that of Example 6; the melting point is about 210° C. (decomposition); $[\alpha]_D^{20} = -30° \pm 2°$ (c.=1%, acetone).

EXAMPLE 8

*Preparation of 2α, 4β, 21-tribromo 17α-hydroxy pregnane 3,11,20-trione (Iα) from 2α, 4β-dibromo 17α-hydroxy pregnane 3,11,20-trione (VI)*

2 g. of compound VI, obtained according to Example 6 or 7 (it suffices to use the product after only one recrystallization having a $[\alpha]_D^{20} = -25° \pm 2°$) are dissolved in 40 cc. of chloroform, 0.2 cc. of a chloroform solution of anhydrous hydrobromic acid (containing 10% of hydrobromic acid) are introduced and then, drop by drop, 0.66 g. of bromine dissolved in 3.4 cc. of anhydrous chloroform. Upon completion of the bromination, 10 g. of water, 10 g. of ice and 2 cc. of a 36° Bé. sodium bisulfite solution are added. The chloroform solution is quickly decanted and first washed with 50 cc. of water, containing 5 cc. of sodium bisulfite, then with water until bromides have been completely removed. The chloroform solution is dried over sodium sulfate and evaporated to dryness under vacuum.

The residue is dissolved in 15 cc. of pure acetic acid. It crystallizes immediately. It is several times pasted with 5 cc. of pure acetic acid, whereby it is dried. Then it is washed with water until neutral and dried under vacuum. 0.8 g. of the desired compound Iα are obtained that are identical in every point with the product described in Example 2. The melting point is 230–232° C. (decomposition); $[\alpha]_D^{20} = -4° \pm 2°$.

It will be obvious from the foregoing examples that, in preparing these compounds, different solvents or oxidizable alcohols may be used, that other mineral salts than lithium chloride may be employed for debromohydration, and that the reaction temperatures, methods of purification and the nature of the solvent by means of which the bromine is attached in the 21-position may be changed without exceeding the scope of this invention.

As will be noted, it is possible according to this invention to obtain the new 17α-hydroxy 2,4,21-tribromo pregnane 3,11,20-trione intermediary (I) and, therefrom, $\Delta^1$-dehydrocortisone from a number of, partly novel, compounds, which greatly enhances the possibility of selecting more efficient and economic processes of preparing this therapeutic agent. In addition to the exemplified methods, it is possible according to this invention to prepare one or the other of the stereoisomeric forms of compound I by dibrominating and oxidizing 21-bromo 3α,17α-dihydroxy pregnane 11,20-dione (VIII) according to the method of the aforementioned U.S. application Serial No. 360,878. Compound I may be also obtained by applying this bromination process to 21-bromo 17α-hydroxy pregnane 3,11,20-trione (IX), or by using 17α-hydroxy pregnane 3,11,20-trione (X) as starting material. Similarly, instead of preparing compound XI from compound X, it is also possible to oxidize, with simultaneous bromination, 3α,17α-dihydroxy pregnane 11,20-dione according to the process of the above-mentioned application.

We claim:

1. A steroid compound selected from the group consisting of 17α-hydroxy-2α,4β-dibromo pregnane-3,11,20-trione, 17α-hydroxy-2α,4β-21-tribromo pregnane-3,11,20-trione, and 17α-hydroxy-2β,4β,21-tribromo pregnane-3,11,20-trione.

2. 17α-hydroxy 21-bromo $\Delta^{1,4}$-pregnadiene 3,11,20-trione.

3. 17α-hydroxy 2α,4β-dibromo pregnane 3,11,20-trione having a melting point of about 210° C. with decomposition and an optical rotation $[\alpha]_D^{20} = $ about $-30° \pm 2°$ (concentration: 1% in acetone).

4. 17α-hydroxy 2β,4β,21-tribromo pregnane 3,11,20-trione.

5. 17α-hydroxy 2α,4β,21-tribromo pregnane 3,11,20-trione.

6. In a process of producing a steroid compound of the formula

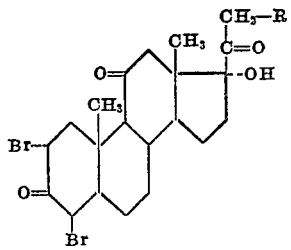

wherein R represents a member selected from the group consisting of hydrogen and bromine, the steps which comprise first adding a solution of hydrobromic acid in glacial acetic acid and, thereafter, a solution of bromine in glacial acetic acid containing sodium acetate to a dioxane solution of a steroid compound of the formula

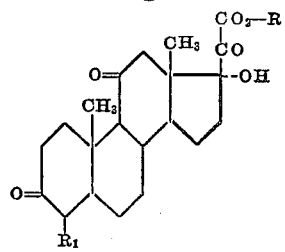

wherein R represents the same member as indicated above, and $R_1$ indicates a member selected from the group consisting of hydrogen and bromine, pouring the reaction mixture into water containing sodium acetate, and isolating the precipitated tribromo compound from the aqueous mixture.

References Cited in the file of this patent

UNITED STATES PATENTS

| | | |
|---|---|---|
| 2,734,899 | Leigh | Feb. 14, 1956 |
| 2,768,189 | Nominee | Oct. 23, 1956 |
| 2,768,191 | Warnant | Oct. 23, 1956 |
| 2,783,226 | Gould et al. | Feb. 26, 1957 |
| 2,789,117 | Sarett | Apr. 16, 1957 |